(12) United States Patent
Yamane et al.

(10) Patent No.: US 11,421,173 B2
(45) Date of Patent: Aug. 23, 2022

(54) RESIN COMPOSITION AND SLIDING MEMBER

(71) Applicant: TAIHO KOGYO CO., LTD., Toyota (JP)

(72) Inventors: Kyohei Yamane, Toyota (JP); Masanori Akizuki, Toyota (JP)

(73) Assignee: TAIHO KOGYO CO., LTD.

( * ) Notice: Subject to any disclaimer, the term of this patent is extended or adjusted under 35 U.S.C. 154(b) by 70 days.

(21) Appl. No.: 16/461,069

(22) PCT Filed: Nov. 16, 2017

(86) PCT No.: PCT/JP2017/041337
§ 371 (c)(1),
(2) Date: May 15, 2019

(87) PCT Pub. No.: WO2018/092857
PCT Pub. Date: May 24, 2018

(65) Prior Publication Data
US 2019/0276762 A1    Sep. 12, 2019

(30) Foreign Application Priority Data

Nov. 17, 2016  (JP) .............................. JP2016-224317

(51) Int. Cl.
*F16C 33/20*       (2006.01)
*C10M 111/04*  (2006.01)
(Continued)

(52) U.S. Cl.
CPC ......... *C10M 111/04* (2013.01); *C10M 103/02* (2013.01); *C10M 103/06* (2013.01);
(Continued)

(58) Field of Classification Search
CPC .............. C10M 125/02; C10M 147/02; C10M 161/00; C10M 149/18; C10M 103/02;
(Continued)

(56) References Cited

U.S. PATENT DOCUMENTS

| 4,898,905 A | 2/1990 | Kawakami et al. |
| 5,427,698 A | 6/1995 | Hirokawa et al. |

(Continued)

FOREIGN PATENT DOCUMENTS

| CN | 103415604 A | 11/2013 |
| EP | 1281881 A1 | 2/2003 |

(Continued)

OTHER PUBLICATIONS

Office Action for Patent Application No. KR 10-2019-7014777 dated May 27, 2020 (9 pages).

(Continued)

*Primary Examiner* — Prem G Singh
*Assistant Examiner* — Francis C Campanell
(74) *Attorney, Agent, or Firm* — Harness, Dickey & Pierce, P.L.C.

(57) ABSTRACT

A sliding member includes: a base material; a coating layer formed on the base material and made of a resin composition including: a binder resin including polyamideimide; PTFE dispersed in the binder resin; and at least one of graphite and $MoS_2$ dispersed in the binder resin; wherein a surface roughness of the coating layer after a sliding test is equal to or less than the surface roughness of the coating layer before the sliding test.

5 Claims, 3 Drawing Sheets

(51) Int. Cl.

| | |
|---|---|
| *C10M 103/02* | (2006.01) |
| *C10M 103/06* | (2006.01) |
| *C10M 107/38* | (2006.01) |
| *C10M 107/44* | (2006.01) |
| *C10M 125/02* | (2006.01) |
| *C10M 125/22* | (2006.01) |
| *C10M 147/02* | (2006.01) |
| *C10M 161/00* | (2006.01) |
| *C10M 149/18* | (2006.01) |
| *C10N 50/08* | (2006.01) |

(52) U.S. Cl.
CPC ........ *C10M 107/38* (2013.01); *C10M 107/44* (2013.01); *C10M 125/02* (2013.01); *C10M 125/22* (2013.01); *C10M 147/02* (2013.01); *C10M 149/18* (2013.01); *C10M 161/00* (2013.01); *C10M 2201/0413* (2013.01); *C10M 2201/0663* (2013.01); *C10M 2213/0623* (2013.01); *C10M 2217/0443* (2013.01); *C10N 2050/08* (2013.01)

(58) Field of Classification Search
CPC .............. C10M 103/06; C10M 107/38; C10M 107/44; C10M 2201/0413; C10M 2201/0663; C10M 2213/0623; C10M 2217/0443; C10M 2201/041; C10M 2201/066; C10M 2213/062; C10N 2050/08; C10N 2020/06; C10N 2030/06; C10N 2040/02; C10N 2010/12; F16C 17/24; F16C 33/1045; F16C 2202/54; F16C 2208/42; F16C 2208/02; F16C 2202/52; F16C 33/201; F16C 2240/54
USPC ........................................................ 508/104
See application file for complete search history.

(56) References Cited

U.S. PATENT DOCUMENTS

| | | | |
|---|---|---|---|
| 5,486,299 A | 1/1996 | Fuwa et al. | |
| 5,700,093 A | 12/1997 | Hiramatsu et al. | |
| 6,305,847 B1 | 10/2001 | Tanaka et al. | |
| 2003/0111511 A1 | 6/2003 | Kanayama et al. | |
| 2004/0259741 A1* | 12/2004 | Sugioka ............... | C09D 179/08 508/106 |
| 2005/0139064 A1 | 6/2005 | Nakamata et al. | |
| 2008/0283021 A1 | 11/2008 | Maier et al. | |
| 2008/0312357 A1 | 12/2008 | Tanaka et al. | |
| 2010/0261625 A1 | 10/2010 | Hakamata | |
| 2011/0082059 A1* | 4/2011 | Iwata ................... | C10M 169/04 508/131 |
| 2012/0101011 A1 | 4/2012 | Makino et al. | |
| 2012/0149611 A1* | 6/2012 | Yamaguchi .......... | C10M 107/00 508/107 |
| 2013/0247699 A1 | 9/2013 | Nomura et al. | |
| 2013/0337271 A1 | 12/2013 | Yoshikawa et al. | |
| 2014/0301880 A1 | 10/2014 | Horibe et al. | |
| 2014/0303050 A1 | 10/2014 | Tomikawa et al. | |
| 2015/0057199 A1 | 2/2015 | Yamasaki et al. | |
| 2015/0330376 A1 | 11/2015 | Taniyama et al. | |
| 2015/0337824 A1* | 11/2015 | Taniyama ............ | F04B 39/0276 417/218 |
| 2016/0251589 A1 | 9/2016 | Kishi et al. | |

FOREIGN PATENT DOCUMENTS

| | | |
|---|---|---|
| EP | 1548067 A1 | 6/2005 |
| EP | 2762552 A1 | 8/2014 |
| JP | H07-097517 A | 4/1995 |
| JP | H08-104803 A | 4/1996 |
| JP | H08-199116 A | 8/1996 |
| JP | H09-236125 A | 9/1997 |
| JP | H11-246823 A | 9/1999 |
| JP | 2002-310345 A | 10/2002 |
| JP | 2002-310345 A | 10/2002 |
| JP | 2005-146366 A | 6/2005 |
| JP | 2005-305395 A | 11/2005 |
| JP | 2008-056750 A | 3/2008 |
| JP | 2008-259965 A | 10/2008 |
| JP | 2009-068390 A | 4/2009 |
| JP | 2010-196813 A | 9/2010 |
| JP | 2011-208612 A | 10/2011 |
| JP | 2011-208613 A | 10/2011 |
| JP | 2011-213761 A | 10/2011 |
| JP | 2016-160293 A | 9/2016 |
| WO | 32-075172 A1 | 9/2002 |
| WO | 2009-041653 A1 | 4/2009 |
| WO | 2012-074107 A1 | 6/2012 |
| WO | 2012-111774 A1 | 8/2012 |
| WO | 2013-047800 A1 | 1/2013 |
| WO | WO-2013-051340 A1 | 4/2013 |
| WO | WO-2014-103073 A1 | 7/2014 |

OTHER PUBLICATIONS

Office Action for Patent Application No. JP 2016-224317 dated Jun. 2, 2020 (7 pages).
Extended European Search Report for Patent Application No. EP 17870663.6 dated Jun. 17, 2020 (7 pages).
Office Action for Patent Application No. JP 2016-224317 dated Feb. 2, 2021 (21 pages).
Li Du-Xin, et al. "Effects of Solid Lubricants on Friction and Wear Behaviors of Polyamide 6"; Journal of Applied Polymer Science; vol. 124; DOI 10,1002/app. 35409; Published online on Nov. 29, 2011 in Wiley Online Library wileyonlinelibrary.com), pp. 4239-4248 (total 11 pages).
W. O. Winer "Molybdenum Disulfide as a Lubricant: A Review of the Fundamental Knowledge"; Dept, of Mechanical Engineering, University of Michigan; Accepted on Feb. 10, 1967; pp. 422-452 (total 31 pages).
Rakesh Kumar Gunda, Suresh Kumar Reddy Narala, Tribological Studies to Analyze the Effect of Solid Lubricant Particle Size on Friction and Wear Behaviour of Ti-6AI-4V Alloy; Surface Coatings Technology 308 (2016); Available online on Aug. 4, 2016; pp. 203-212 (total 10 pages).
Japanese Office Action for Application No. 2016-224316 dated Mar. 3, 2020 with English translation (4 pages).
Korean Office Action for corresponding Korean Application No. 10-2019-7014779 dated May 15, 2020 with English translation (12 pages).
Extended European Search Report for Patent Application No. EP 17872673.3 dated Jun. 2, 2020 (7 pages).
Japanese Office Action for Application No. 2016-224316 dated Aug. 24, 2020 with English translation (6 pages).
Korean Office Action for corresponding Korean Application No. 10-2019-7014779 dated Dec. 23, 2020 with English translation (11 Pages).
Chinese Office Action for corresponding Chinese Application No. 201780069675.3 dated Dec. 28, 2020 with English translation (12 Pages).
European Office Action for corresponding European Application No. 17872673.3 dated Feb. 8, 2021 (5 Pages).
Chinese Office Action for corresponding Chinese Application No. 201780069675.3 dated Jun. 1, 2021 with English translation (10 Pages).
Li Du-Xin, et al. "Effects of Solid Lubricants on Friction and Wear Behaviors of Polyamide 6"; Journal of Applied Polymer Science; vol. 124; DOI 10,1002/app. (wileyonlinelibrary.com), pp. 4239-4248 (total 11 pages).

* cited by examiner

Sliding Surface before test  
Roughness: 3.166 μm RzJIS

Sliding Surface after test  
Roughness: 2.013 μm RzJIS

Sliding Surface before test  
Roughness: 3.147 μm RzJIS

Sliding Surface after test  
Roughness: 1.489 μm RzJIS

Sliding Surface before test  
Roughness: 2.618 μm RzJIS

Sliding Surface after test  
Roughness: 6.945 μm RzJIS

RESIN COMPOSITION AND SLIDING MEMBER

CROSS-REFERENCE TO RELATED APPLICATIONS

This application is a U.S. National Stage Application of International Application No. PCT/JP2017/041337, filed on Nov. 16, 2017, which claims priority to Japanese Application No. 2016-224317, filed on Nov. 17, 2016. The entire disclosures of the above applications are incorporated herein by reference.

TECHNICAL FIELD

The present invention relates to a sliding member.

RELATED ART

To improve characteristics of a sliding surface, a sliding material with a resin coating layer is known, in which PTFE, graphite, and $MoS_2$ are used as additives in a binder resin (refer to JP 2002-310345 and JP 2008-056750).

In the technology disclosed in JP 2002-310345 and JP 2008-056750, a problem exists in that a solid lubricant is liable to fall off or cleave under a high-load state, as a result of which the sliding surface becomes rougher. When the sliding surface becomes rough, formation of an oil film is impeded, particularly where an amount of oil present is low, or in a dry environment where a supply of lubricating oil is insufficient. Under such circumstances, abrasion and seizure resistance decreases.

The present invention provides a technique for improving wear and seizure resistance under a high load state in an environment where a supply of lubricating oil supply is insufficient.

SUMMARY

The present invention provides a sliding member including: a base material; a coating layer formed on the base material and made of a resin composition including the following a binder resin including polyamideimide; PTFE dispersed in the binder resin; and at least one of graphite and MoS2 dispersed in the binder resin; wherein a surface roughness of the coating layer after a sliding test is equal to or less than the surface roughness of the coating layer before the sliding test, the sliding test being carried out under the following condition:

Testing device: Oil spray type poor lubrication tester

Speed: 6.3 m/sec

Surface pressure: 2 to 20 MPa (incremental increase: 2 MPa/min.)

Time: up to 10 min.

Lubrication method: Spray

Lubricating oil: refrigeration oil

Counterpart material: Bearing steel.

The surface roughness after the sliding test may be equal to or less than the half of the surface roughness before the sliding test.

The surface roughness after the sliding test may be equal to or less than 2.1 μm RzJIS.

Advantageous Effect

According to the present invention, wear and seizure resistance can be improved under a high load state in an environment where a supply of lubricating oil is insufficient.

DETAILED DESCRIPTION

1. Configuration

Figure 1:
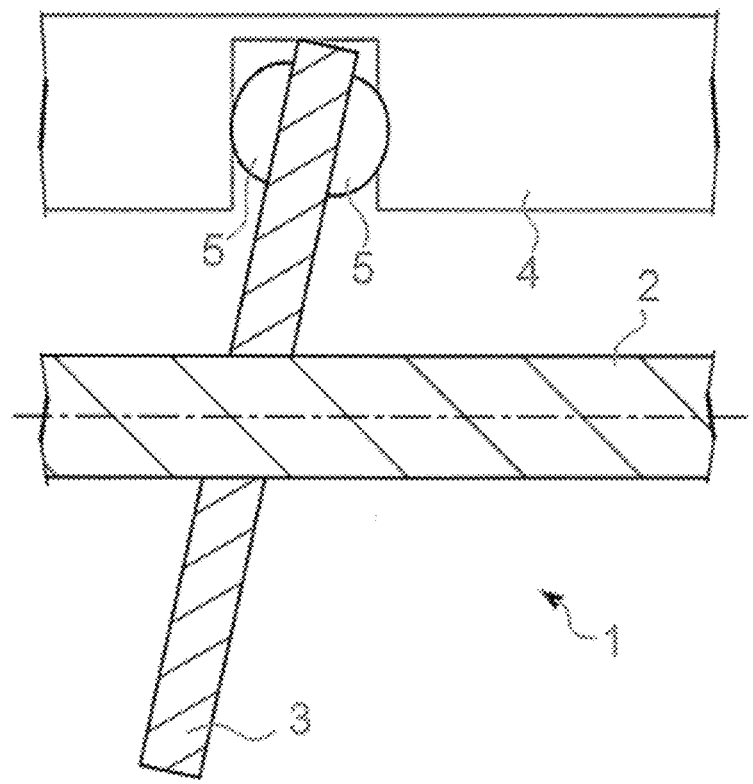
FIG. 1 is a schematic cross-sectional view showing the structure of compressor 1 according to one embodiment.

FIG. 1 is a schematic cross-sectional view showing the structure of compressor 1 according to one embodiment of the present invention. Compressor 1 is a swash plate type compressor. Compressor 1 includes shaft 2, swash plate 3, piston 4 and shoe 5. Shaft 2 is rotatably supported relative to a housing (not shown in the figures). Swash plate 3 is fixed at an oblique angle relative to the axis of rotation of shaft 2. Swash plate 3 is an example of the sliding member according to the present invention. Piston 4 reciprocates in a cylinder bore (not shown in the figures) provided in the housing. Shoe 5 is provided between swash plate 3 and piston 4 and slides with each of swash plate 3 and piston 4, respectively. In shoe 5, the surface that slides with swash plate 3 is substantially flat, and the surface sliding with piston 4 has a dome-like (hemispherical) shape. Shoe 5 is an example of a mating member that slides on the sliding member according to the present invention. The rotation of shaft 2 is converted to the reciprocating motion of piston 4 by swash plate 3.

Figure 2:
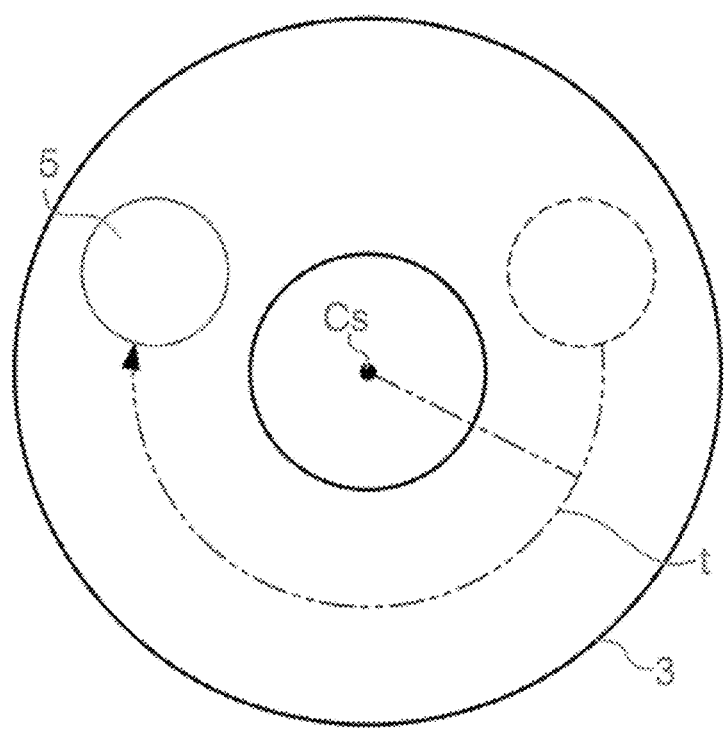
FIG. 2 illustrates an example of the positional relationship between swash plate 3 and shoes 5.

FIG. 2 illustrates an example of the positional relationship between swash plate 3 and shoes 5. FIG. 2 is a view from a direction perpendicular to the sliding surface. Swash plate 3 is disk-shaped overall, and has a hole at its center. Viewed from swash plate 3, shoe 5 performs rotational movement on the sliding surface. Here, "rotational movement" refers to a movement by which shoe 5 defines a circular trajectory relative to swash plate 3.

Figure 3:
FIG. 3 illustrates an exemplary cross-sectional structure of swash plate 3.

FIG. 3 illustrates an exemplary cross-sectional structure of swash plate 3. FIG. 3 is a schematic view showing a structure in cross section perpendicular to the surface that slides with shoe 5. Swash plate 3 has a substrate 31, coating layer 32, and coating layer 33. Coating layer 32 and coating layer 33 both slide on shoe 5. Each of coating layer 32 and coating layer 33 are examples of the coating layer according to the present invention. The base material 31 is formed to be disk-shaped with a hole at its center. The base material is made of an alloy satisfying the required characteristics, for example, the material is an iron-based, copper-based, or aluminum-based alloy. From the viewpoint of preventing adhesion with shoe 5, swash plate 3 is preferably made of a material different from that of shoe 5.

Coating layer 32 is formed to improve the characteristics of the sliding surface of swash plate 3. Coating layer 32 is made of a resin composition. The resin composition includes a binder resin and an additive dispersed in the binder resin. The binder resin is made of, for example, a thermosetting resin. At least one of polyamideimide (PAI), polyamide (PA), and polyimide (PI), epoxy, and phenol is used as the thermosetting resin, for example. Among these, the binder resin preferably includes at least one of PAI and PI. For example, the content of the binder resin in the resin composition is preferably 50 to 80 vol %. More preferably, the content of the binder resin is more than 60 vol %. More preferably, the upper limit of the content of the binder resin is 75 vol %.

A solid lubricant is used as the additive. The solid lubricant is added to improve lubricating properties, in other words, to reduce a coefficient of friction. For example, the resin composition includes 20 to 50 vol % of solid lubricant in total. PTFE (polytetrafluoroethylene) is used as the solid lubricant. Furthermore, this resin composition includes, in addition to PTFE, at least one of graphite (Gr) and $MoS_2$. The content of $MoS_2$ is preferably less than the content of PTFE. For example, the content of PTFE is 10 to 30 vol %, and more preferably 15 to 25 vol %. The content of $MoS_2$ is 0 to 10 vol %, preferably 0 to 4 vol % (that is, $MoS_2$ may not be included). The content of graphite is preferably 0 to 20 vol %, more preferably 10 to 20 vol %. Moreover, it is preferable that the content of $MoS_2$ is less than the content of graphite.

The average particle diameter of the additive added to the binder resin is preferably less than 10 μm, and more preferably, equal to or less than 5 μm, in order to enhance the smoothness of the sliding surface and to assist the formation of an oil film. Here, the average particle diameter means the 50% diameter (median diameter) in the distribution of the sphere equivalent diameter obtained by the laser diffraction method in the state of the raw material before mixing with the binder resin. When the average particle diameter of the additive is less than 10 μm, the sliding surface is maintained smooth, in contrast to where the average particle diameter of the additive is equal to or less than 10 μm, and as a result formation of an oil film is enhanced. Therefore, transition from boundary lubrication to mixed lubrication or fluid lubrication is facilitated, and enhanced lubrication is easily obtained even under severe conditions such as low oil content and high load.

The average particle size of PTFE is preferably larger than either the average particle size of graphite or the average particle size of $MoS_2$. The inventors of the present invention hypothesize that by using PTFE having an average particle diameter larger than that of graphite and $MoS_2$, the PTFE is stretched on the sliding surface to cover the graphite or $MoS_2$, whereby smoothness of the sliding surface is easily maintained.

The resin composition may further include hard particles as the additive. As the hard particle, at least one of an oxide, a nitride, a carbide, and a sulfide is used, for example. The average particle size of the hard particles is preferably less than 10 μm, and more preferably smaller than the average particle size of PTFE.

Coating layer 33 is also formed using the same resin composition as coating layer 32. In the substrate 31, the surface that acts as the sliding surface, that is, the surface on which coating layer 32 is formed and the surface on which coating layer 33 is formed are substantially flat. The surface of the substrate 31 may be roughened to enhance the adhesion to coating layer 32. In addition, an intermediate layer may be formed between the substrate 31 and coating layer 32.

The present invention is not limited to the above embodiment and various modifications can be applied to the embodiment. For example, the sliding member having a coating layer formed using the resin composition according to the present embodiment is not limited to a swash plate for a compressor. The sliding member may be a shoe for a compressor, or a half bearing, a bush, or a thrust washer used in an engine.

2. Experiment Examples

The present inventors manufactured test pieces of the sliding member under various conditions. The present inventors evaluated their characteristics. Cast iron was used as the base material of the sliding member. The base material was processed to have the shape of the swash plate shown in FIG. 1. The coating layer was formed on this base material, and was made of the resin composition described in Table 1. PAI was used as the binder resin. Experiment Example 3 is an example where the average particle size of $MoS_2$ is larger than the average particle size of PTFE.

TABLE 1

|  | | PTFE | | Gr. | | $MoS_2$ | |
| --- | --- | --- | --- | --- | --- | --- | --- |
|  | binder resin vol % | vol % | average particle size (μm) | vol % | average particle size (μm) | vol % | average particle size (μm) |
| Experiment Example 1 | Val. | 16 | 5 | 18 | 2 | 2 | 2 |
| Experiment Example 2 | Val. | 20 | 5 | 18 | 2 | not included | — |
| Experiment Example 3 | Val. | 11 | 5 | 16 | 2 | 19 | 20 |

First, the abrasion resistance test was performed on the test pieces of the above three experiment examples. The test conditions of the abrasion resistance test were as follows.

Test equipment: High pressure atmosphere friction and wear tester
Speed: 40 m/sec
Surface pressure: 4 to 12 MPa (increased incrementally by 2 MPa/3 min)
Time: Hold for 1 hour at maximum surface pressure
Atmosphere: refrigerant and poor lubrication
Counterpart material: Bearing steel The present inventor observed the sliding surface of the test pieces after the test, and confirmed whether the coating layer was worn or not. Although abrasion occurred in Experiment Example 3, no abrasion was found in Experiment Examples 1 and 2. Thus, compared with Experiment Example 3, Experiment Examples 1 and 2 showed improved wear resistance.

Furthermore, the present inventors performed a seizure resistance test on the test pieces of Experiment Examples 1 and 2. The test conditions of the seizure resistance test were as follows.

Figure 4:
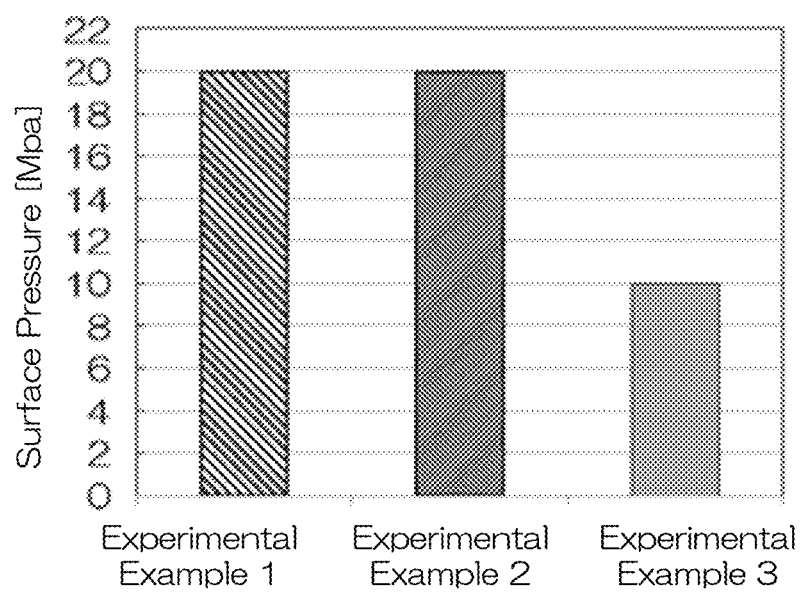
FIG. 4 shows a surface pressure measured in a contact resistance test.

Testing device: Oil spray type poor lubrication tester
Speed: 6.3 m/sec
Surface pressure: 2 to 20 MPa (incremental increase: 2 MPa/min.)
Time: up to 10 min.
Lubrication method: Spray
Lubricating oil: refrigeration oil
Counterpart material: Bearing steel FIG. 4 shows the surface pressure measured in the contact resistance test. While seizure occurred in the test piece of Experiment Example 3 at a surface pressure of 10 MPa, no seizure occurred in the test pieces of Experiment Examples 1 and 2 even at a maximum surface pressure of 20 MPa of the test apparatus. Thus, compared with Experiment Example 3, Experiment Examples 1 and 2 showed improved seizure resistance.

Furthermore, the present inventors performed a sliding test on the test pieces of Experiment Examples 1 and 2, and measured the surface roughness of the sliding surface before and after the test using a surface roughness meter (SP81B manufactured by Kosaka Laboratory). Further, the surface was observed with an electron microscope. The test conditions of the sliding test were the same as those of the seizure resistance test described above.

Figure 5A:
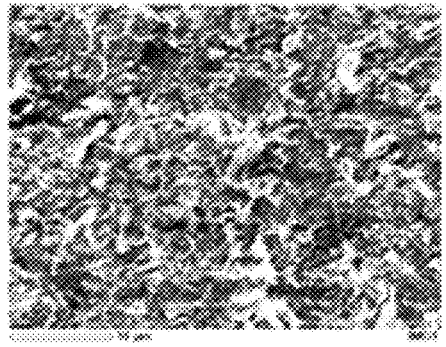
FIGS. 5A-5C show states of sliding surfaces before and after sliding tests.
Figure 5A:
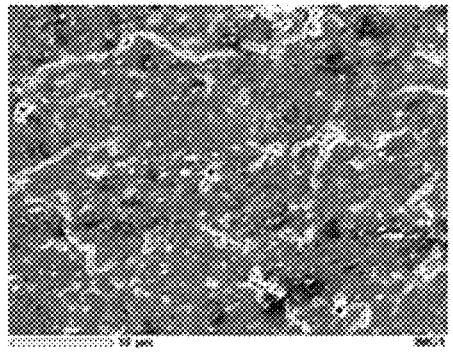
Figure 5B:
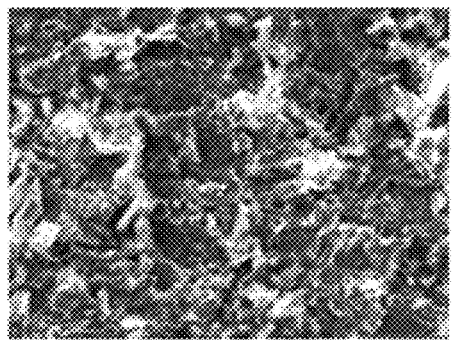
Figure 5B:
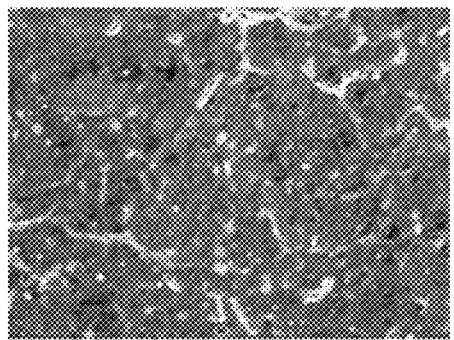
Figure 5C:
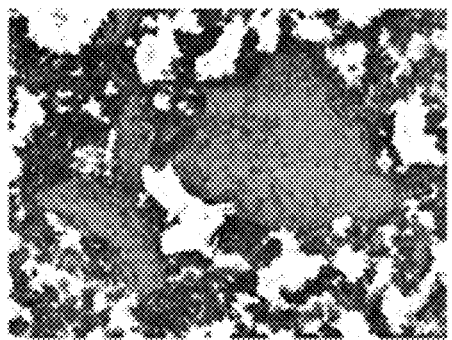
Figure 5C:
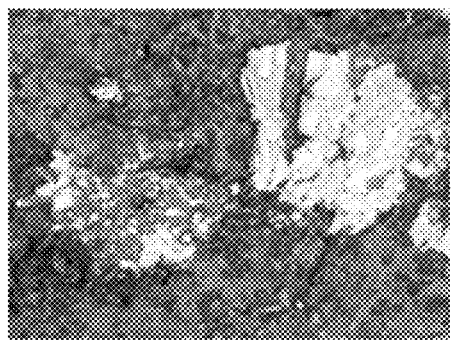

FIGS. 5A-5C show states of sliding surfaces before and after sliding tests. FIG. 5A shows Experiment Example 1, FIG. 5B shows Experiment Example 2, and FIG. 5C shows Experiment Example 3. It is of note that the surface roughness is measured according to the ten-point average roughness RzJIS defined in JIS B 0601: 2001. While the surface roughness increased in Experiment Example 3 during the sliding test, the surface roughness decreased in Experiment Examples 1 and 2 during the sliding test. The surface roughness after the sliding test was equal to or less than the half of the surface roughness before the sliding test. Further, the surface roughness after the sliding test was equal to or less than 2.1 μm RzJIS. In other words, while the surface became rougher in Experiment Example 3 after use, the surface became smoother in Experiment Examples 1 and 2 after use.

The invention claimed is:

1. A sliding member comprising:
 a base material; and
 a coating layer formed on the base material and made of a resin composition including:
  greater than or equal to about 50 vol. % to less than or equal to about 80 vol. % of a binder resin including polyamideimide;
  greater than or equal to about 10 vol % to less than or equal to about 30 vol. % of PTFE dispersed in the binder resin;
  greater than or equal to 10 vol. % to less than or equal to 20 vol. % of graphite dispersed in the binder resin; and
  greater than 0 vol. % to less than or equal to about 10 vol. % of $MoS_2$ dispersed in the binder resin,
 wherein the coating layer is free of a PTFE film forming agent,
 wherein each of the PTFE, graphite, and $MoS_2$ has an average particle diameter less than 5 micrometers, and
 wherein a surface roughness of the coating layer after a sliding test is equal to or less than the surface roughness of the coating layer before the sliding test, the sliding test being carried out under the following condition:
 Testing device: Oil spray type poor lubrication tester
 Speed: 6.3 m/sec
 Surface pressure: 2 to 20 MPa (incremental increase: 2 MPa/min.)
 Time: up to 10 min.
 Lubrication method: Spray
 Lubricating oil: refrigeration oil
 Counterpart material: Bearing steel.

2. The sliding member according to claim 1, wherein the surface roughness after the sliding test is equal to or less than the half of the surface roughness before the sliding test.

3. The sliding member according to claim 1, wherein the surface roughness after the sliding test is equal to or less than 2.1 μm.

4. The sliding member according to claim 2, wherein the surface roughness after the sliding test is equal to or less than 2.1 μm.

5. The sliding member according to claim 1, wherein the average particle diameter of the PTFE is greater than that of the graphite, and the average particle diameter of the PTFE is greater than that of the $MoS_2$.

* * * * *